US011067383B2

(12) United States Patent
Liu et al.

(10) Patent No.: US 11,067,383 B2
(45) Date of Patent: Jul. 20, 2021

(54) CONCENTRICITY MEASUREMENT PLATFORM

(71) Applicants: Tyco Electronics (Shanghai) Co. Ltd., Shanghai (CN); TE Connectivity Corporation, Berwyn, PA (US)

(72) Inventors: Hongtao Liu, Shanghai (CN); Dandan Zhang, Shanghai (CN); Roberto Francisco-Yi Lu, Bellevue, WA (US); Lei Zhou, Shanghai (CN)

(73) Assignees: Tyco Electronics (Shanghai) Co. Ltd., Shanghai (CN); TE Connectivity Corporation, Berwyn, PA (US)

( * ) Notice: Subject to any disclaimer, the term of this patent is extended or adjusted under 35 U.S.C. 154(b) by 0 days.

(21) Appl. No.: 16/701,632

(22) Filed: Dec. 3, 2019

(65) Prior Publication Data

US 2020/0173768 A1   Jun. 4, 2020

(30) Foreign Application Priority Data

Dec. 3, 2018   (CN) .......................... 201822012649.1

(51) Int. Cl.
*G01B 11/08* (2006.01)
*G06T 7/50* (2017.01)
*G01B 11/06* (2006.01)

(52) U.S. Cl.
CPC .............. *G01B 11/08* (2013.01); *G01B 11/06* (2013.01); *G06T 7/50* (2017.01)

(58) Field of Classification Search
CPC ........ G01B 11/06; G01B 11/08; G01B 21/10; G06T 7/50; G06T 7/62
See application file for complete search history.

(56) References Cited

U.S. PATENT DOCUMENTS

| 2,433,558 | A | * | 12/1947 | Hurley, Jr. | ............. | G01B 11/08 |
| | | | | | | 356/394 |
| 4,634,273 | A | * | 1/1987 | Farleman | ............... | G01B 11/08 |
| | | | | | | 356/237.1 |
| 6,816,609 | B1 | * | 11/2004 | Shimizu | ............... | G01B 11/024 |
| | | | | | | 348/86 |
| 2002/0131633 | A1 | * | 9/2002 | Zwick | .................. | G06T 7/0004 |
| | | | | | | 382/152 |
| 2014/0063509 | A1 | * | 3/2014 | Nygaard | ................ | G01B 11/12 |
| | | | | | | 356/625 |
| 2016/0203387 | A1 | * | 7/2016 | Lee | ........................... | G06T 7/73 |
| | | | | | | 348/44 |
| 2017/0178315 | A1 | * | 6/2017 | Cho | .......................... | G06T 7/60 |
| 2020/0072602 | A1 | * | 3/2020 | Zhou | .................... | G01B 11/272 |

OTHER PUBLICATIONS

Anonymous. "Concentric Part Inspection Device". IBM Technical Disclosure Bulletin, vol. 25, No. 12, May 1983, pp. 6402-6403. (Year: 1983).*

* cited by examiner

*Primary Examiner* — Michael A Lyons
(74) *Attorney, Agent, or Firm* — Barley Snyder

(57) ABSTRACT

A concentricity measurement platform includes a vision system capturing an image of an annular member to be measured and a computer system communicatively coupled to the vision system. The computer system calculates a concentricity of the annular member based on the image captured by the vision system.

18 Claims, 4 Drawing Sheets

CONCENTRICITY MEASUREMENT PLATFORM

CROSS-REFERENCE TO RELATED APPLICATION

This application claims the benefit of the filing date under 35 U.S.C. § 119(a)-(d) of Chinese Patent Application No. 201822012649.1, filed on Dec. 3, 2018.

FIELD OF THE INVENTION

The present invention relates to a concentricity measurement platform and, more particularly, to a concentricity measurement platform adapted to measure a concentricity of an annular member.

BACKGROUND

A concentricity of an annular member is usually measured manually. However, the efficiency and accuracy of the manual measurement are very low.

SUMMARY

A concentricity measurement platform includes a vision system capturing an image of an annular member to be measured and a computer system communicatively coupled to the vision system. The computer system calculates a concentricity of the annular member based on the image captured by the vision system.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
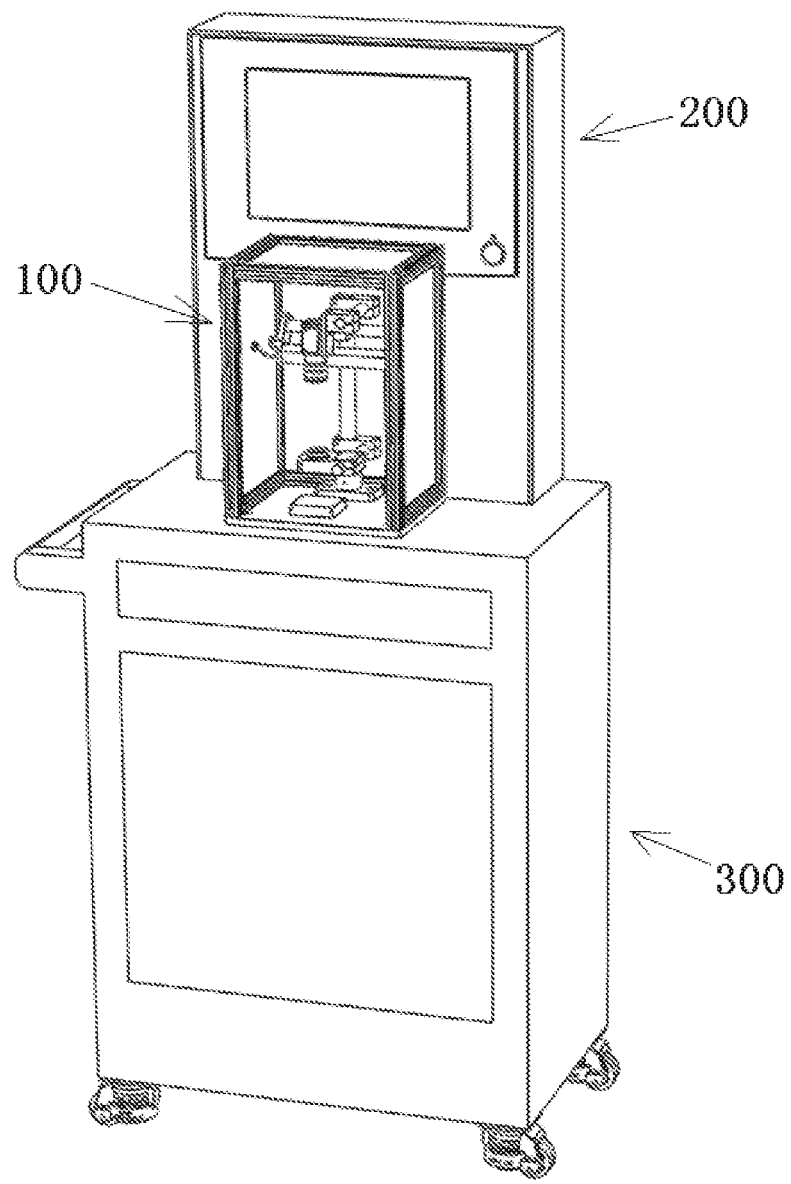
FIG. 1 is a perspective view of a concentricity measurement platform according to an embodiment.

Technical solutions of the disclosure will be described hereinafter in further detail with reference to the following embodiments, taken in conjunction with the accompanying drawings. In the specification, the same or similar reference numerals indicate the same or similar parts. The description of the embodiments of the disclosure hereinafter with reference to the accompanying drawings is intended to explain the general inventive concept of the disclosure and should not be construed as a limitation on the disclosure.

In addition, in the following detailed description, for the sake of explanation, numerous specific details are set forth in order to provide a thorough understanding of the disclosed embodiments. It will be apparent, however, that one or more embodiments may also be practiced without these specific details. In other instances, well-known structures and devices are illustrated schematically in order to simplify the drawing.

A concentricity measurement platform according to an embodiment, as shown in FIG. 1, comprises a vision system 100 and a computer system 200 communicatively coupled to the vision system 100. The vision system 100 is adapted to capture an image of an annular member 20 to be measured. The computer system 200 is adapted to calculate a concentricity of the annular member 20 based on the image captured by the vision system 100. The concentricity measurement platform can perform the concentricity measurement of the annular member 20 automatically, thus improving the measurement efficiency and accuracy.

Figure 2:
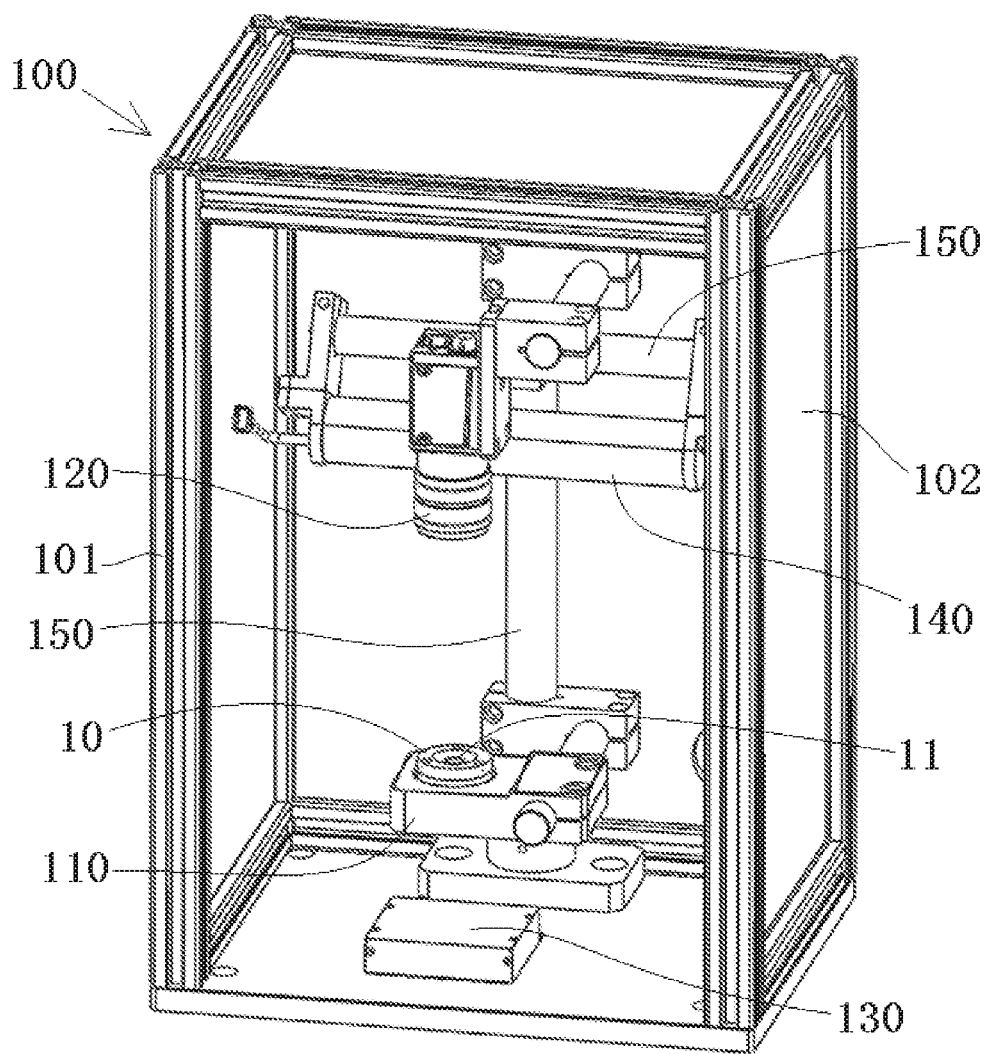
FIG. 2 is perspective view of a vision system of the concentricity measurement platform.
Figure 3:
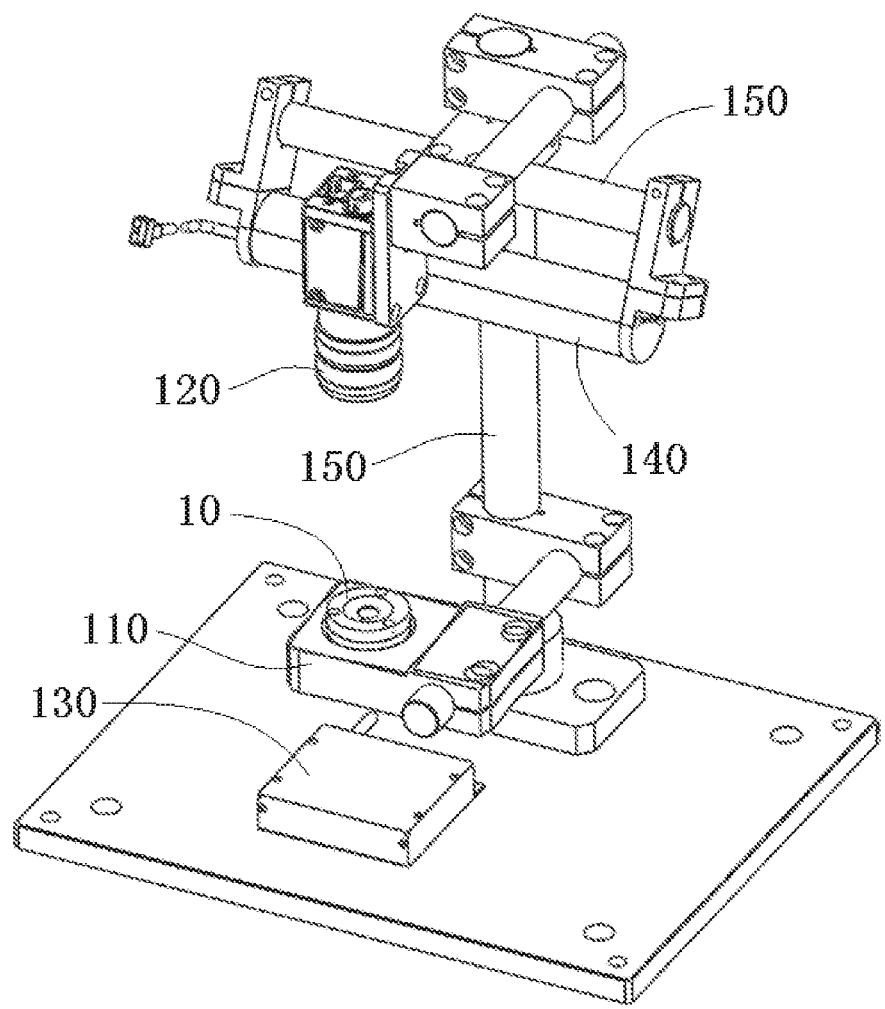
FIG. 3 is a perspective view of components of the vision system inside a housing of the vision system.
Figure 4:
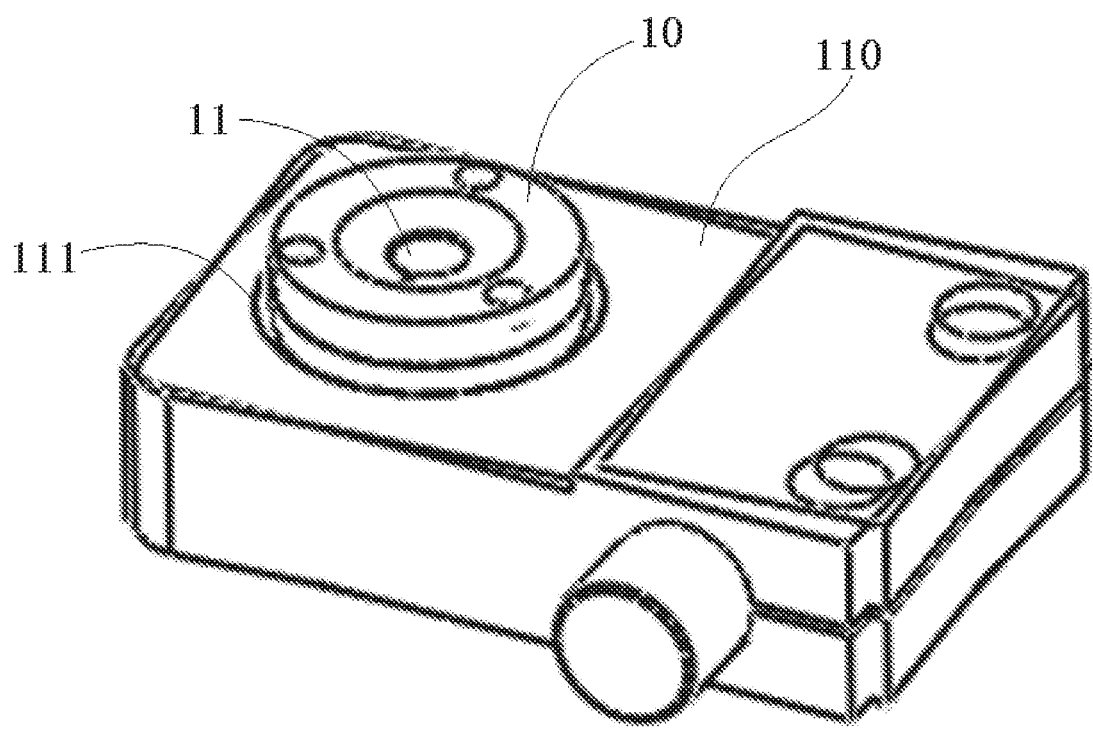
FIG. 4 is a perspective view of a base and a carrier of the vision system.

The vision system 100, as shown in FIGS. 2-4, includes a carrier 10 and a camera 120. The carrier 10 has a loading portion adapted to load the annular member 20 thereon. The camera 120 is disposed directly above the carrier 10 and configured for capturing the image of the annular member 20 loaded on the carrier 10. The vision system 100 includes a base 110 formed with a first through hole having a conical upper opening 111. The carrier 10 is adapted to be positioned in the conical upper opening 111 of the first through hole.

The carrier 10, as shown in FIGS. 2-4, has a second through hole in which a transparent plate 11 is disposed. The annular member 20 is supported on the transparent plate 11. The second through hole has a conical upper opening, and the annular member 20 is adapted to be positioned in the conical upper opening of the second through hole.

The concentricity measurement platform, as shown in FIGS. 2 and 3, comprises a backlight source 130 arranged below the base 110. Light emitted from the backlight source 130 passes through the base 110 and the carrier 20 via the first and second through holes and the transparent plate 11 so as to provide backlight illumination for the annular member 20.

The concentricity measurement platform, as shown in FIGS. 2 and 3, comprises a front light source 140 arranged above the base 110 to provide illumination for a measurement operator. The backlight source 130 and the front light source 140 are communicatively coupled to the computer system 200, and the computer system 200 is adapted to control an on state and an off state of the backlight source 130 and the front light source 140 such that one of the backlight source 130 and the front light source 140 is turned on when the other is turned off.

The concentricity measurement platform, as shown in FIG. 2, comprises a housing 101 in which the base 110, the camera 120, the backlight source 130 and the front light source 140 are accommodated and mounted. In the shown embodiment, a light shielding panel 102 is mounted on the housing 101 to prevent external light from entering the housing 101.

The concentricity measurement platform, as shown in FIGS. 2 and 3, comprises a mounting bracket 150 fixed onto an inner wall of the housing 101. The base 110, the camera 120 and the front light source 140 are fixed onto the mounting bracket 150, and the backlight source 130 is fixed on a bottom wall of the housing 101.

The carrier 10 is rotatable within the conical upper opening 111 of the base 110 so as to adjust a position of the annular member 20 loaded on the carrier 10. The conical upper opening 111 of the base 110 is sized to match with the carrier 10 such that the carrier 10 is concentrically positionable within the conical upper opening 111 of the base 110, as shown in FIG. 4. When the carrier 10 is concentrically positioned in the conical upper opening 111 of the base 110, central axes of the first through hole in the base 110 and the second through hole in the carrier 10 are coincided with an optical axis of the camera 120.

In an embodiment, the computer system 200 shown in FIG. 1 is an industrial personal computer (IPC) having a display for displaying the image captured by the vision system 100 and a concentricity calculated based on the captured image.

Figure 5:
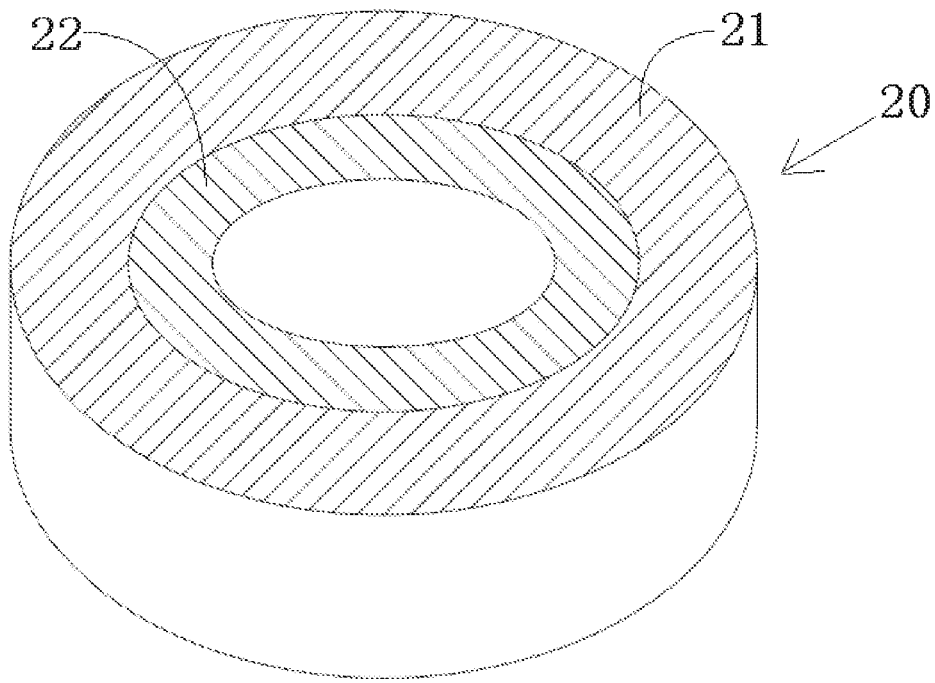
FIG. 5 is a perspective view of an annular member according to an embodiment.

The annular member 20, as shown in FIG. 5, is a tube slice including an outer ring 21 and an inner ring 22 having different colors. The concentricity measurement platform is adapted to measure the concentricity of the outer ring 21 and the inner ring 22 based on thicknesses (measured in a radial direction) of the outer ring 21 and the inner ring 22.

The concentricity measurement platform, as shown in FIG. 1, comprises a movable support stage 300 having rollers, the vision system 100 and the computer system 200 being carried on the movable support stage 300.

It should be appreciated by those skilled in this art that the above embodiments are intended to be illustrative, and many modifications may be made to the above embodiments by those skilled in this art, and various structures described in various embodiments may be freely combined with each other without conflicting in configuration or principle.

Although the disclosure has been described hereinbefore in detail with reference to the attached drawings, it should be appreciated that the disclosed embodiments in the attached drawings are intended to illustrate the embodiments of the disclosure by way of example, and should not be construed as limitation to the disclosure.

Although several exemplary embodiments have been shown and described, it would be appreciated by those skilled in the art that various changes or modifications may be made to these embodiments without departing from the principles and spirit of the disclosure, the scope of which is defined by the claims and their equivalents.

What is claimed is:

1. A concentricity measurement platform, comprising:
   a vision system capturing an image of an annular member to be measured, including:
   a base having a first through hole;
   a carrier positioned in the first through hole and having a loading portion and a second through hole coaxial with the first through hole in which a transparent plate is disposed, the annular member is loaded on the loading portion and supported on the transparent plate; and
   a camera disposed directly above the carrier for capturing the image of the annular member on the carrier; and
   a computer system communicatively coupled to the vision system, the computer system calculates a concentricity of the annular member based on the image captured by the vision system.

2. The concentricity measurement platform of claim 1, wherein the first through hole includes a conical upper opening.

3. The concentricity measurement platform of claim 2, wherein the second through hole has a conical upper opening, the annular member is positioned in the conical upper opening of the second through hole.

4. The concentricity measurement platform of claim 1, further comprising a backlight source arranged below the base, a light emitted from the backlight source passes through the base and the carrier via the first through hole, the second through hole, and the transparent plate to provide backlight illumination for the annular member.

5. The concentricity measurement platform of claim 4, further comprising a front light source arranged above the base.

6. The concentricity measurement platform of claim 5, wherein the backlight source and the front light source are communicatively coupled to the computer system, the computer system controls an on state and an off state of the backlight light source and the front light source such that one of the backlight light source and the front light source is turned on when the other is turned off.

7. The concentricity measurement platform of claim 5, further comprising a housing in which the base, the camera, the backlight light source and the front light source are accommodated and mounted.

8. The concentricity measurement platform of claim 7, wherein the housing has a light shielding panel mounted on the housing and preventing an external light from entering the housing.

9. The concentricity measurement platform of claim 7, further comprising a mounting bracket fixed onto an inner wall of the housing, the base, the camera, and the front light source are fixed onto the mounting bracket and the backlight source is fixed on a bottom wall of the housing.

10. The concentricity measurement platform of claim 1, wherein the carrier is rotatably positioned within the first through hole so as to adjust a position of the annular member loaded on the carrier.

11. The concentricity measurement platform of claim 1, wherein a central axis of the first through hole and a central axis of the second through hole coincide with an optical axis of the camera.

12. The concentricity measurement platform of claim 1, wherein the computer system has a display displaying the image and the concentricity.

13. The concentricity measurement platform of claim 1, wherein the annular member has an outer ring and an inner ring.

14. The concentricity measurement platform of claim 13, wherein the computer system measures the concentricity of the outer ring and the inner ring based on a measured radial thickness of the outer ring and a measured radial thickness of the inner ring.

15. The concentricity measurement platform of claim 1, further comprising a movable support stage with a plurality of rollers, the vision system and the computer system are carried on the movable support stage.

16. A concentricity measurement platform, comprising:
   a vision system capturing an image of an annular member to be measured, including:
   a carrier having a loading portion, the annular member is loaded on the loading portion;
   a camera disposed directly above the carrier for capturing the image of the annular member on the carrier; and
   a base having a first through hole with a conical upper opening, wherein the carrier is positioned in the conical upper opening of the first through hole; and
   a computer system communicatively coupled to the vision system, the computer system calculates a concentricity of the annular member based on the image captured by the vision system.

17. The concentricity measurement platform of claim 16, wherein the carrier has a second through hole in which a transparent plate is disposed, the annular member is supported on the transparent plate.

18. The concentricity measurement platform of claim 5, wherein the conical upper opening of the first through hole is sized to match with the carrier and the carrier is concentrically positioned within the conical upper opening of the first through hole.

* * * * *